United States Patent
Kinoshita et al.

(10) Patent No.: US 9,396,857 B2
(45) Date of Patent: Jul. 19, 2016

(54) MAGNETIC CIRCUIT AND KEY INPUT DEVICE

(71) Applicant: Sony Corporation, Tokyo (JP)

(72) Inventors: Akihito Kinoshita, Nagano (JP); Hitoshi Kubota, Nagano (JP); Yasushi Tsuji, Nagano (JP); Shuichi Chihara, Nagano (JP); Masahiro Kobori, Tokyo (JP); Junichiro Misawa, Nagano (JP)

(73) Assignee: Sony Corporation (JP)

( * ) Notice: Subject to any disclaimer, the term of this patent is extended or adjusted under 35 U.S.C. 154(b) by 0 days.

(21) Appl. No.: 14/062,281

(22) Filed: Oct. 24, 2013

(65) Prior Publication Data
US 2014/0125436 A1   May 8, 2014

(30) Foreign Application Priority Data
Nov. 7, 2012   (JP) .................. 2012-245251

(51) Int. Cl.
*H01H 9/00* (2006.01)
*H01F 7/02* (2006.01)
*H01H 13/85* (2006.01)
*G06F 3/02* (2006.01)

(52) U.S. Cl.
CPC ............ *H01F 7/0205* (2013.01); *G06F 3/0202* (2013.01); *H01H 13/85* (2013.01); *H01H 2215/042* (2013.01); *H01H 2221/04* (2013.01)

(58) Field of Classification Search
CPC . H01H 36/004; H01H 13/85; H01H 2221/04; H01H 2215/042
USPC .................................................. 335/205–207
See application file for complete search history.

(56) References Cited

U.S. PATENT DOCUMENTS

| 3,419,832 | A | * | 12/1968 | Baermann | 335/285 |
| 4,201,489 | A | * | 5/1980 | Zapp | 400/485 |
| 2012/0169603 | A1 | | 7/2012 | Peterson et al. | |

* cited by examiner

*Primary Examiner* — Ramon M Barrera
(74) *Attorney, Agent, or Firm* — Lerner, David, Littenberg, Krumholz & Mentlik, LLP

(57) ABSTRACT

There is provided a magnetic circuit including a first magnetic body configured to include a magnet and a yoke plate, and a second magnetic body. The yoke plate forms an opening space at a position facing the second magnetic body. The magnet is disposed in the opening space or at a position sandwiched between the yoke plates.

10 Claims, 18 Drawing Sheets

FIG.8
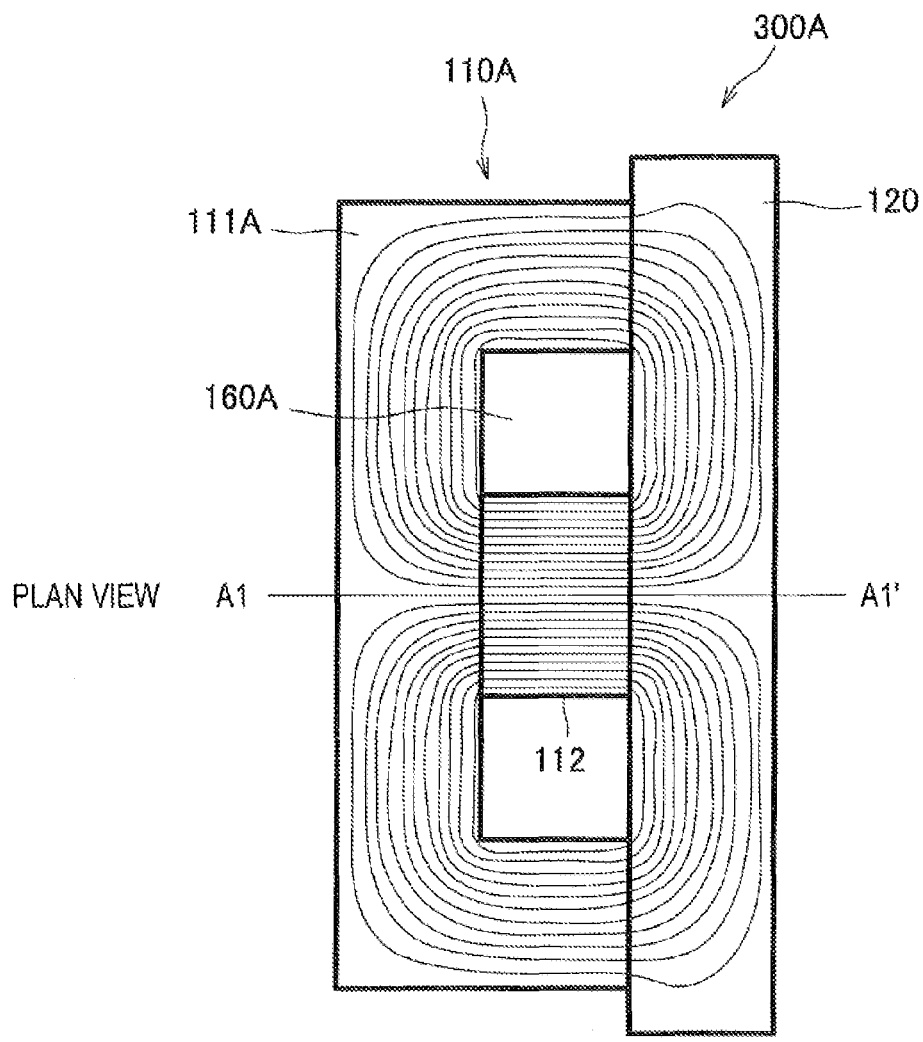
PLAN VIEW
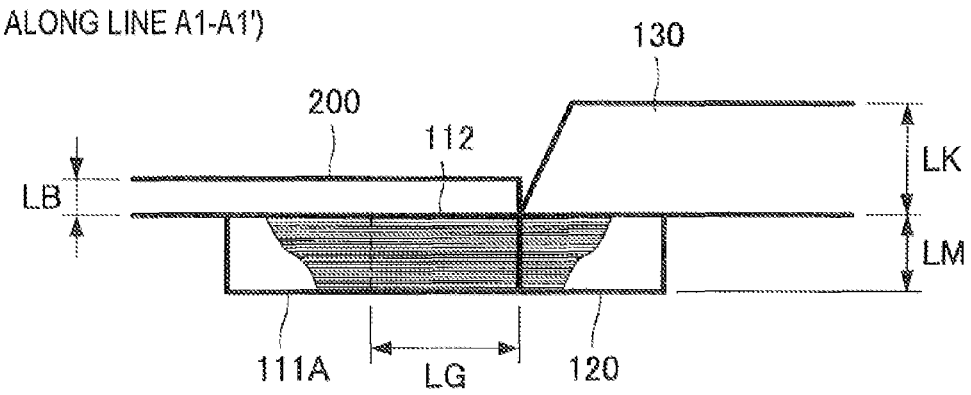
SECTIONAL SIDE VIEW
(TAKEN ALONG LINE A1-A1')

FIG.9
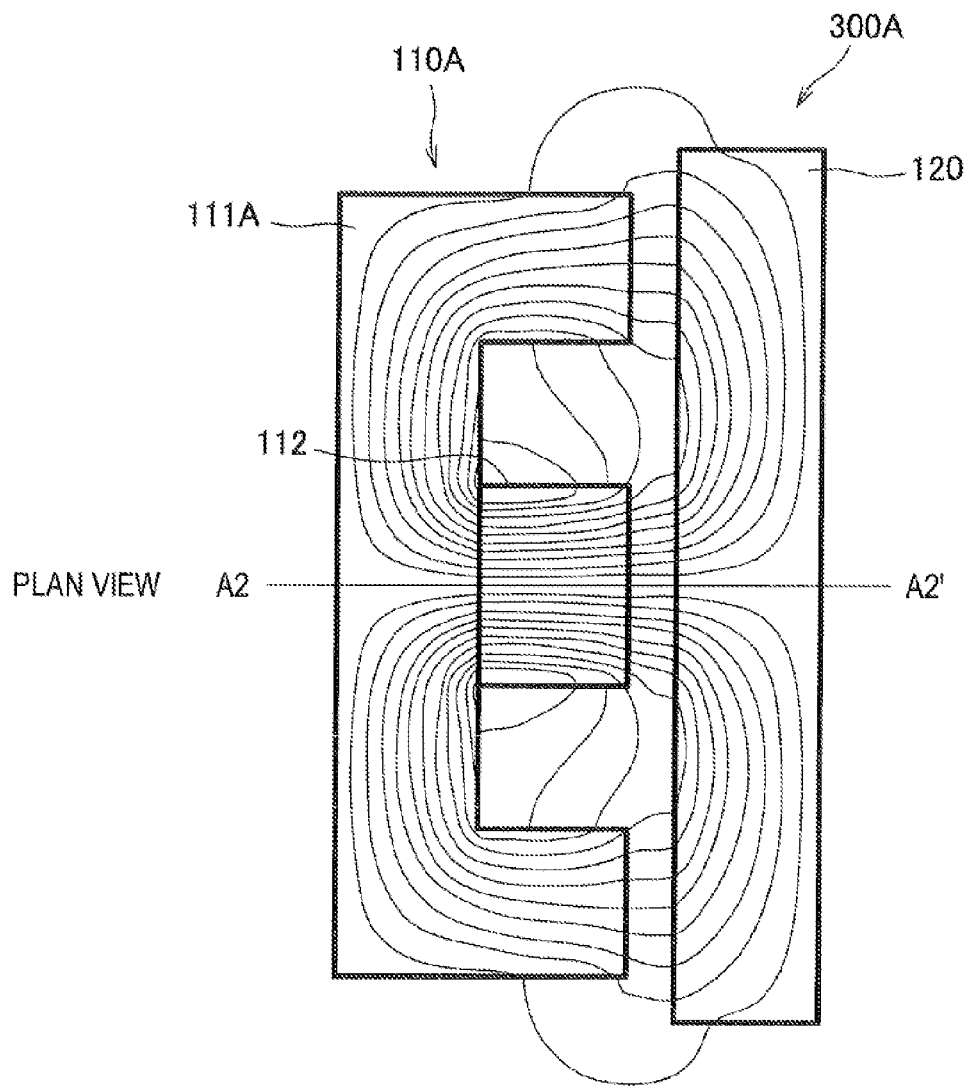
PLAN VIEW   A2 — A2'
SECTIONAL SIDE VIEW
(TAKEN ALONG LINE A2-A2')
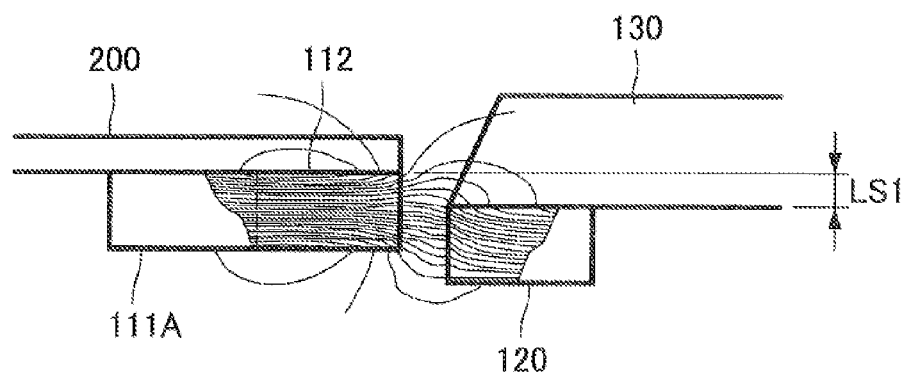

FIG.10
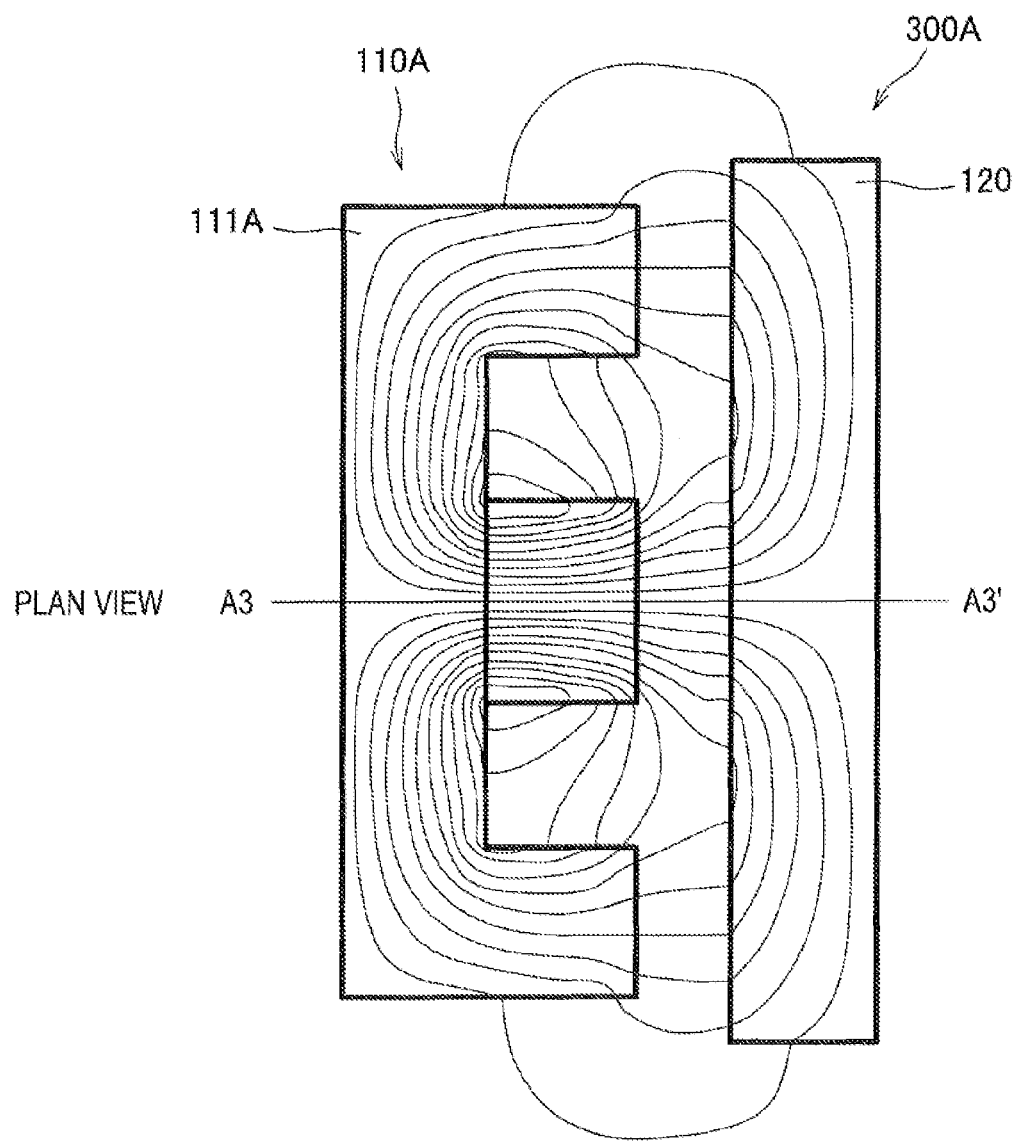
PLAN VIEW
SECTIONAL SIDE VIEW
(TAKEN ALONG LINE A3-A3')
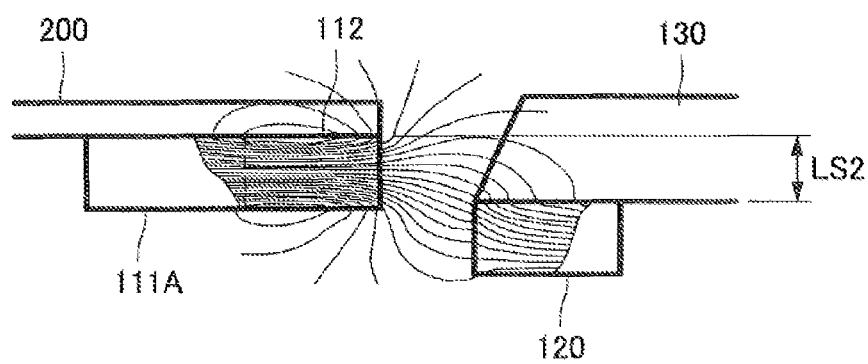

FIG.16
PLAN VIEW A1 —————————————————————————— A1'
912A  912B
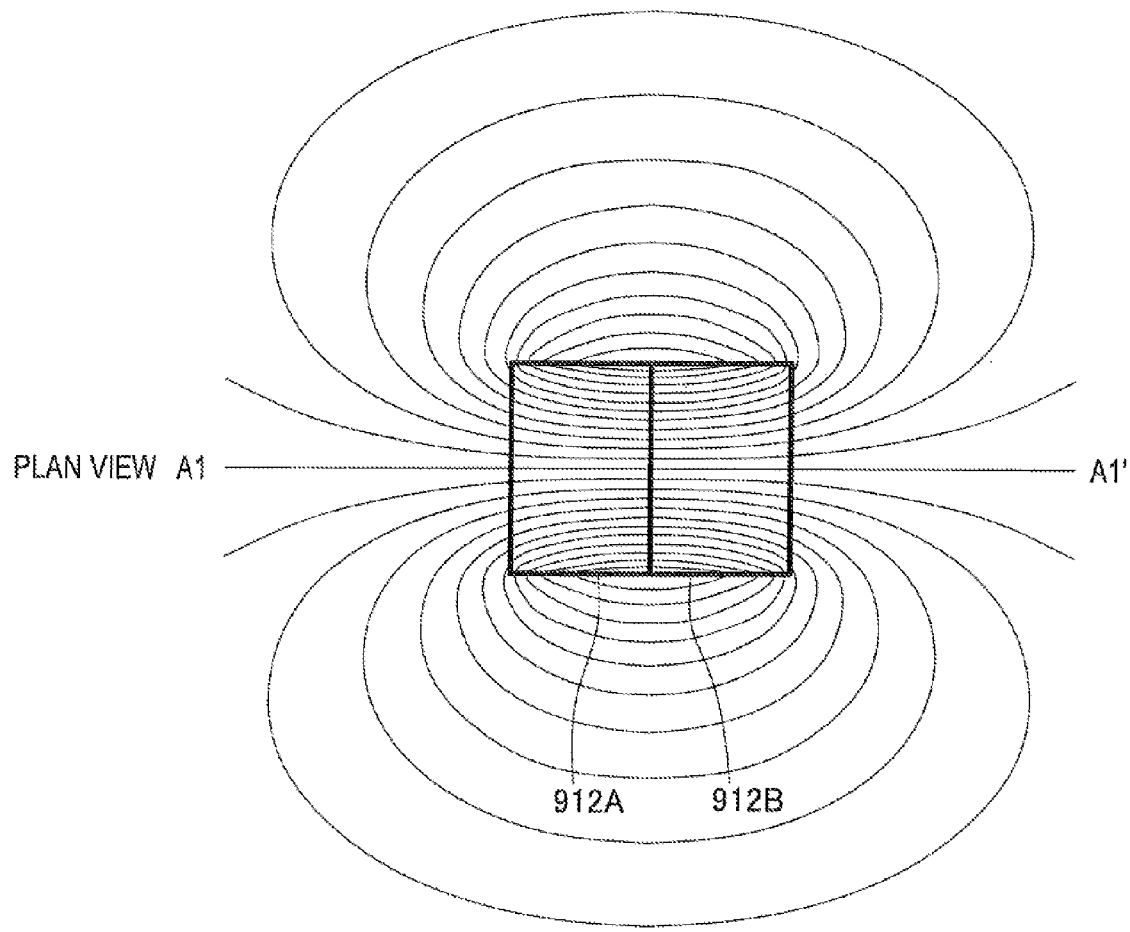
SECTIONAL SIDE VIEW
(TAKEN ALONG LINE A1-A1')
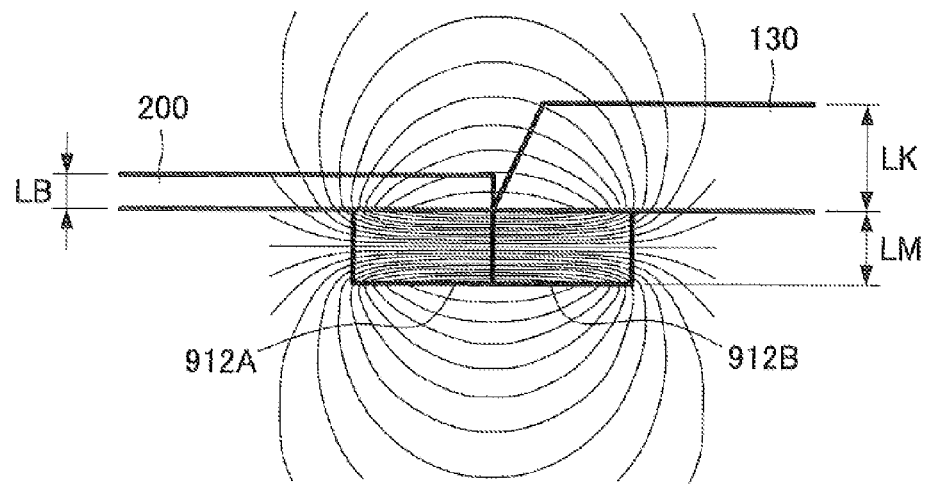

FIG. 17
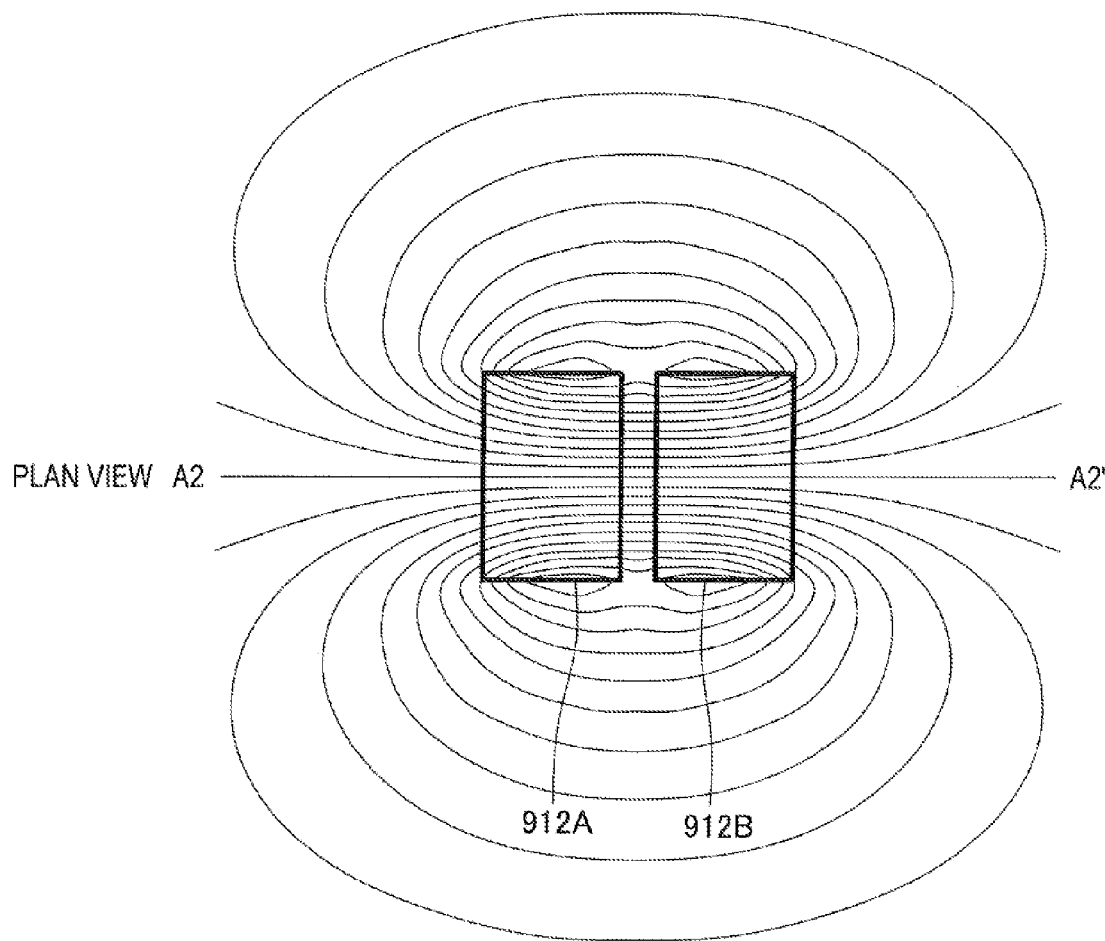
PLAN VIEW A2 — A2'
912A  912B
SECTIONAL SIDE VIEW
(TAKEN ALONG LINE A2-A2')
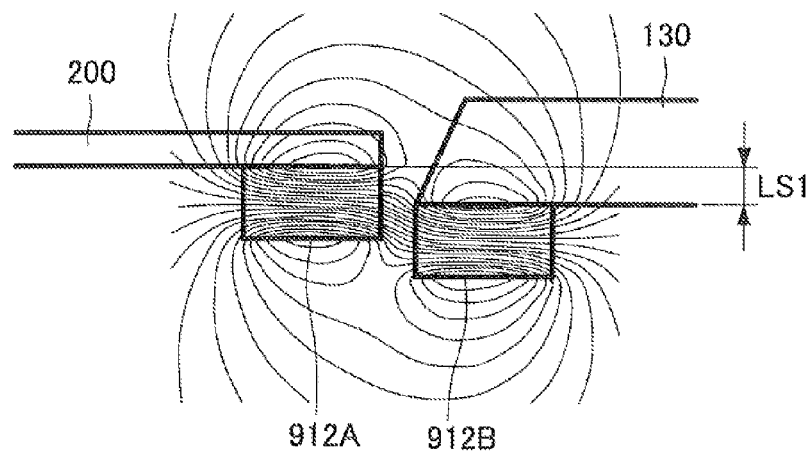

FIG.18
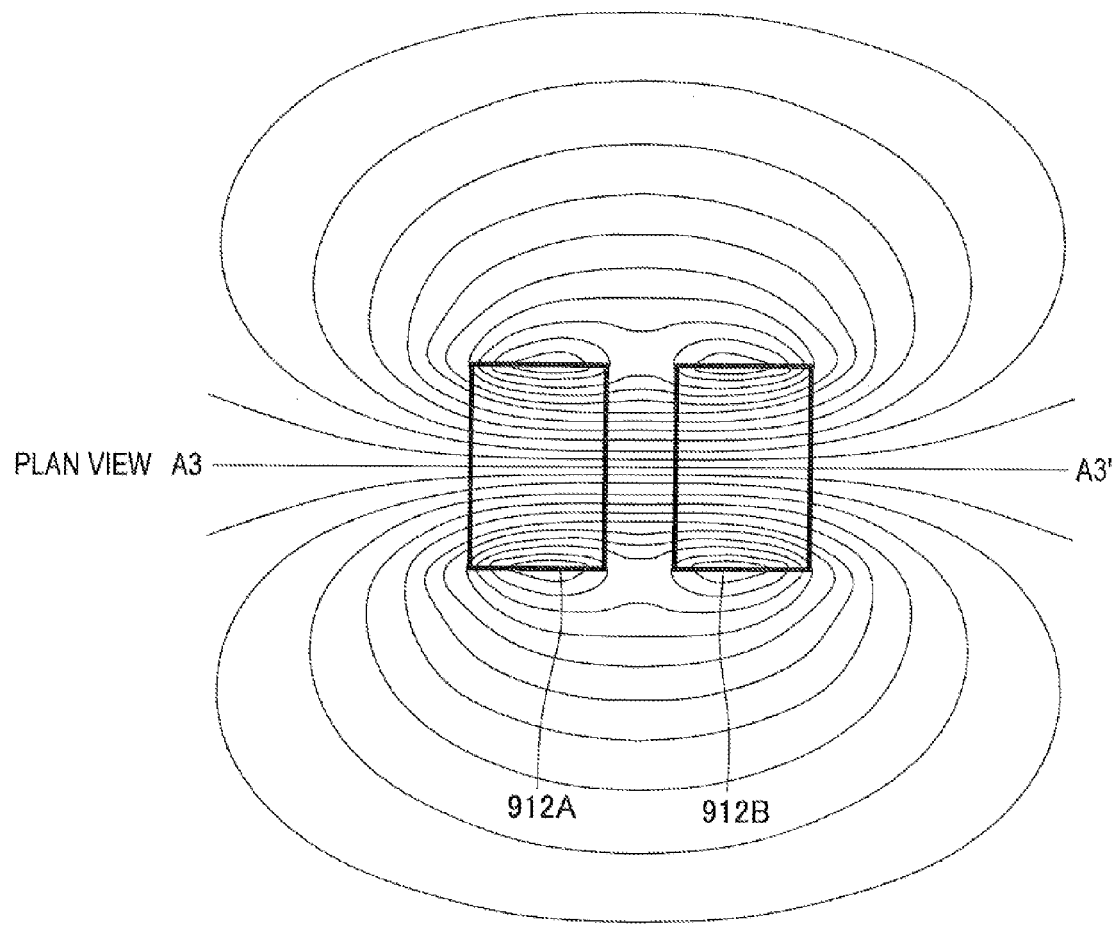
PLAN VIEW A3 — A3'
SECTIONAL SIDE VIEW
(TAKEN ALONG LINE A3-A3')
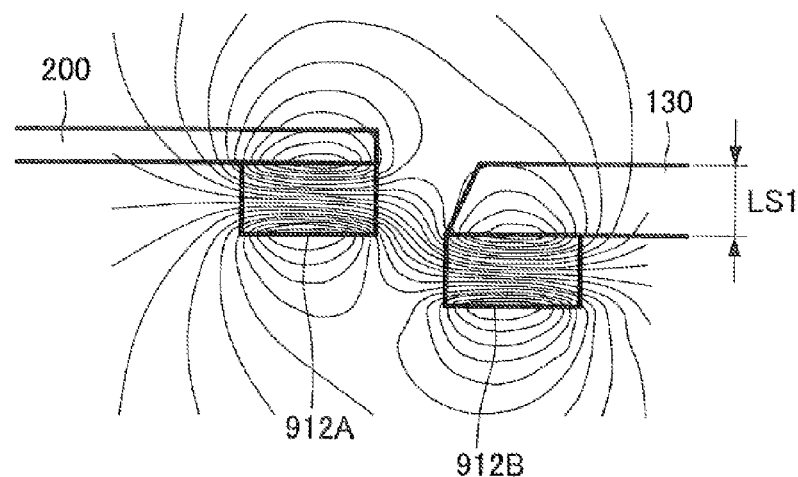

MAGNETIC CIRCUIT AND KEY INPUT DEVICE

CROSS REFERENCE TO RELATED APPLICATIONS

This application claims the benefit of Japanese Priority Patent Application JP 2012-245251 filed Nov. 7, 2012, the entire contents of which are incorporated herein by reference.

BACKGROUND

The present disclosure relates to a magnetic circuit and a key input device.

In recent years, reduction in thickness of a key input device such as keyboards has been developed. For example, a key input device provided with rubber domes and scissor mechanism is mainly used in a personal computer (PC) keyboard. In such a key input device, when a user presses a keytop horizontally supported by the scissor mechanism, the keytop depresses the rubber dome, and then an electrical connection is made in a membrane sheet circuit and an input signal is transmitted.

In general, rubber domes can be manufactured cost-effectively, and thus it is possible to manufacture the key input device at low cost. However, there is a limit to further reduction in thickness of the rubber dome and scissor mechanism. As an example, a further reduction in thickness of the rubber dome causes a key-depression feeling given to a user when pressing a keytop to make worse due to deterioration of the buckling characteristic of the rubber dome (this feeling will be referred to hereinafter as "click feeling") and it becomes unclear if the keytop is pressed. In addition, for example, a further reduction in thickness of the scissor mechanism will cause the strength thereof to be reduced and thus the durability thereof will be impaired.

Thus, there has been proposed a method of using a magnetic attraction force or attractive force acting between a pair of magnets (or between a magnet and a magnetic body such as metal pieces) without using the buckling characteristic of the rubber dome (for example, refer to U.S. Patent Application Publication No. 2012/0169603). When this method (using a magnetic force) is applied to the key input device, it is possible to use a magnetic attraction force or attractive force acting between a pair of magnets (or between a magnet and a magnetic body such as metal pieces) as a force for maintaining a keytop in position. Thus, it is possible to achieve further reduction in thickness of the key input device while suppressing the deterioration of a click feeling given to the user.

SUMMARY

However, in the above-described techniques, there is provided with an "open magnetic path" in which one or more pairs of magnets or a combination of a magnet and a magnetic body such as metal pieces are arranged in a magnetization direction. In this case, the leakage of a magnetic field (lines of magnetic force), that is, leakage of magnetic flux that passes through the surrounding space from a pole face of non-facing magnets or a pole face of a magnetic body such as metal pieces is large. In addition, a magnetic recording medium, sensor, or the like located inside or outside of a product will be affected by magnetic noise or the like. Furthermore, the use of one or more pairs of magnets or the like increases the manufacturing cost. Therefore, it is desirable to implement a technology that is capable of using a magnetic attraction force or attractive force generated by a magnet and capable of manufacturing cost-effectively.

According to an embodiment of the present disclosure, there is provided a magnetic circuit that includes a first magnetic body and a second magnetic body. The first magnetic body includes a magnet and a yoke plate. The yoke plate forms an opening space at a position facing the second magnetic, and the magnet is disposed in the opening space or at a position sandwiched between the yoke plates.

As described above, according to one or more of embodiments of the present disclosure, it is possible to significantly prevent the magnetic field (lines of magnetic force) emanating from the magnet from being leaked to its surrounding space and to effectively use the magnetic field. Consequently, it is possible to manufacture the magnetic circuit that uses a magnetic attraction force or attractive force between the magnet and the magnetic body at much lower cost. In addition, it becomes possible to reduce leakage of magnetic flux.

BRIEF DESCRIPTION OF THE DRAWINGS

FIG. 8 is a diagram illustrating a magnetic field (lines of magnetic force) distribution at the start of pressing a keytop;

FIG. 9 is a diagram illustrating a magnetic field (lines of magnetic force) distribution in a state where the keytop is pressed;

FIG. 10 is a diagram illustrating a magnetic field (lines of magnetic force) distribution at the end of pressing a keytop;

FIG. 16 is a diagram illustrating a magnetic field (lines of magnetic force) distribution at the start of pressing a keytop according to a comparative example;

FIG. 17 is a diagram illustrating a magnetic field (lines of magnetic force) distribution in a state where the keytop is pressed according to the comparative example; and FIG. 18 is a diagram illustrating a magnetic field (lines of magnetic force) distribution at the end of pressing a keytop according to a comparative example.

DETAILED DESCRIPTION OF THE EMBODIMENT(S)

Figure 1:
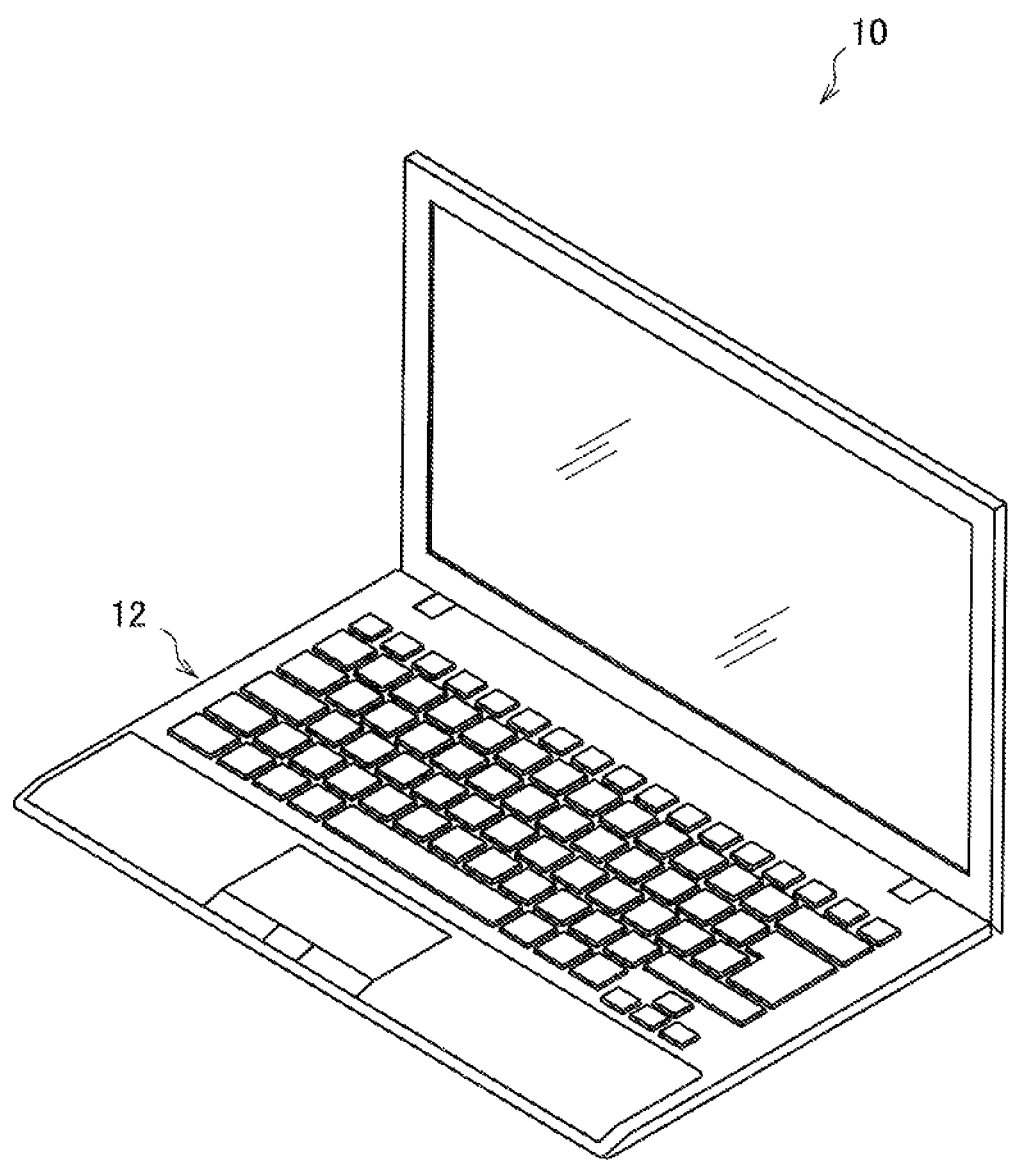
FIG. 1 is a diagram illustrating an exemplary appearance of an information processing apparatus according to an embodiment of the present disclosure.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

Moreover, in this specification and the drawings, a plurality of components having substantially the same function and structure may also be distinguished by affixing a different alphabetical letter to the same reference numeral. However, when it is not necessary to particularly distinguish between a plurality of component having substantially the same function and structure, they are denoted by the same reference numeral.

Embodiments for implementing the present disclosure will be described below in the following order.

1. Embodiment
1-1. Exemplary Appearance of Information Processing Apparatus
1-2. Exemplary Appearance of Key Input Device
2. First Embodiment
2-1. Exemplary Configuration of Key Input Unit
2-2. Exemplary Movement of Key Input Unit
2-3. Exemplary Change in Magnetic Field (Lines of Magnetic Force) Distribution
2-4. Relationship between Magnetic body Thickness and Magnetic Field (Lines of Magnetic Force) Distribution
2-5. Modified Example
3. Second Embodiment
4. Third Embodiment
5. Fourth Embodiment
6. Conclusion

1. EMBODIMENT

An embodiment of the present disclosure will now be described.

[1-1. Exemplary Appearance of Information Processing Apparatus]

An exemplary appearance of an information processing apparatus 10 according to an embodiment of the present disclosure is described. FIG. 1 is a diagram illustrating an exemplary appearance of the information processing apparatus 10 according to an embodiment of the present disclosure. As illustrated in FIG. 1, the information processing apparatus 10 includes a key input device 12. The information processing apparatus 10 configured as a notebook personal computer (PC) is shown in FIG. 1, but the information processing apparatus 10 may be configured as different types of PCs (for example, desktop PCs) equipped with the key input device 12.

The key input device 12 is only one example of a device that incorporates a magnetic circuit according to an embodiment of the present disclosure. Thus, the magnetic circuit according to an embodiment of the present disclosure may be incorporated into any device other than the key input device 12. As an example, the magnetic circuit according to an embodiment of the present disclosure may be incorporated into an input device for accepting the input by a button operation. When the magnetic circuit according to an embodiment of the present disclosure is incorporated into a device other than the key input device 12, the information processing apparatus 10 may not be provided.

There has been described above an exemplary appearance of the information processing apparatus 10 according to an embodiment of the present disclosure.

[1-2. Exemplary Appearance of Key Input Device]

Figure 2:
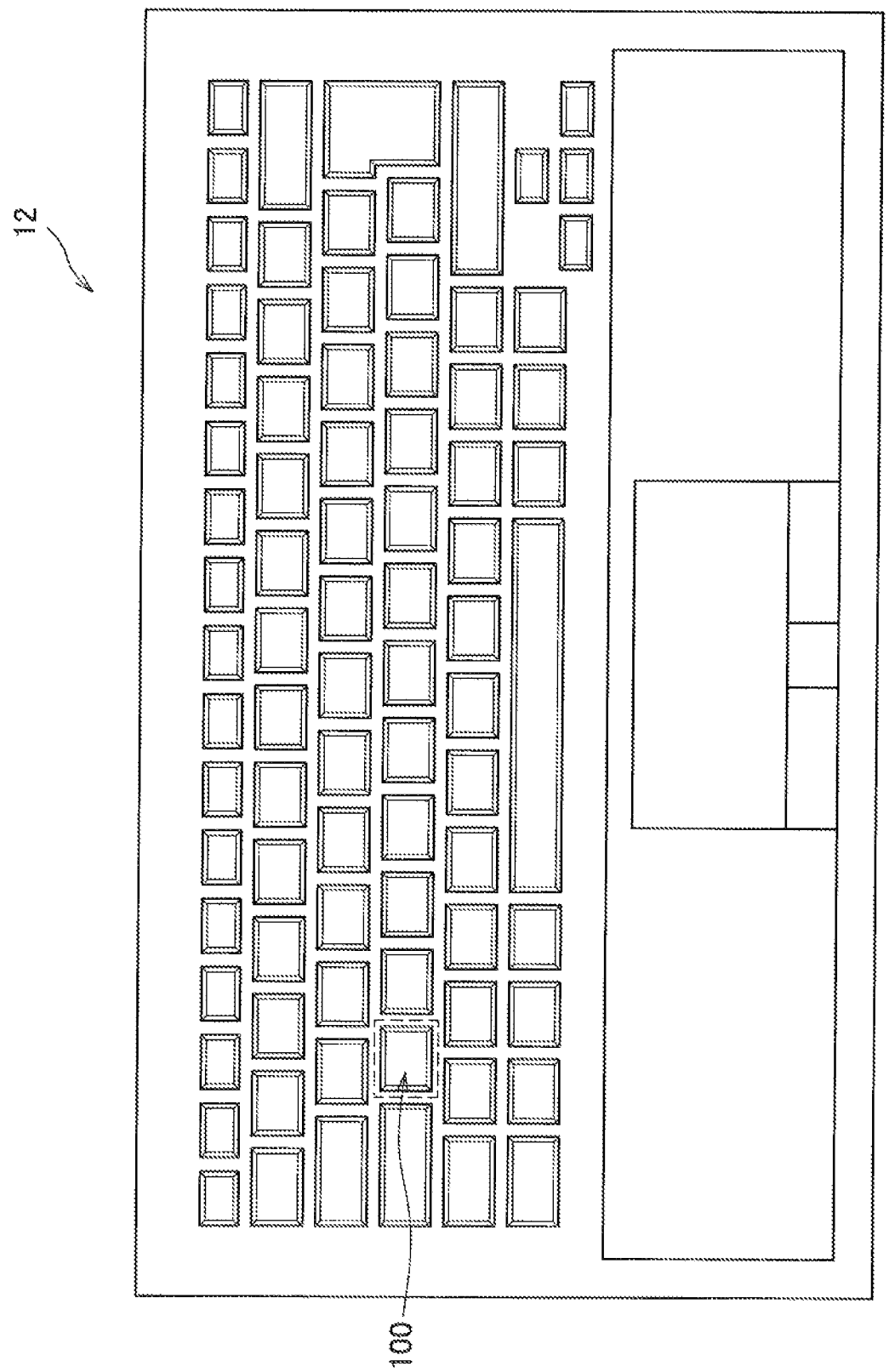
FIG. 2 is a diagram illustrating an exemplary appearance of a keyboard according to an embodiment of the present disclosure.

An exemplary appearance of the key input device 12 according to an embodiment of the present disclosure will now be described. FIG. 2 is a diagram illustrating an exemplary appearance of the key input device 12 according to an embodiment of the present disclosure. The key input device 12 includes a plurality of key input units. FIG. 2 shows a key input unit 100 as an example of a plurality of key input units. In the following, a description will be given of a function of the key input unit 100 shown in FIG. 2, but the key input unit 100 is described as a representative example in explaining a plurality of key input units. Thus, any other key input units than the key input unit 100 may have a similar function.

There has been described above an exemplary appearance of the key input device 12 according to an embodiment of the present disclosure.

2. FIRST EMBODIMENT

A first embodiment of the present disclosure is described below.

2-1. Exemplary Configuration of Key Input Unit

Figure 3:
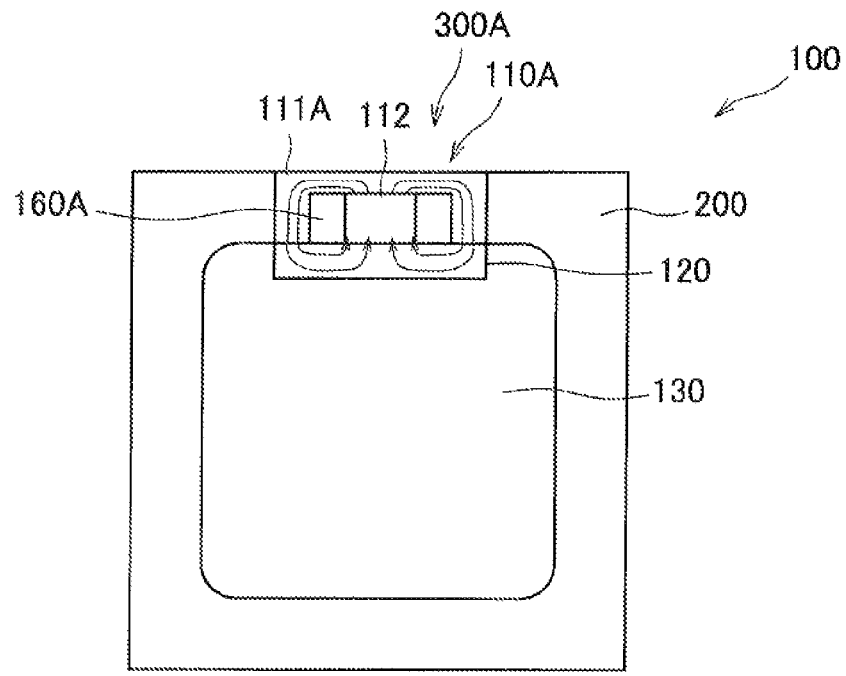
FIG. 3 is an example of a plan view of a key input device according to a first embodiment of the present disclosure.
Figure 4:
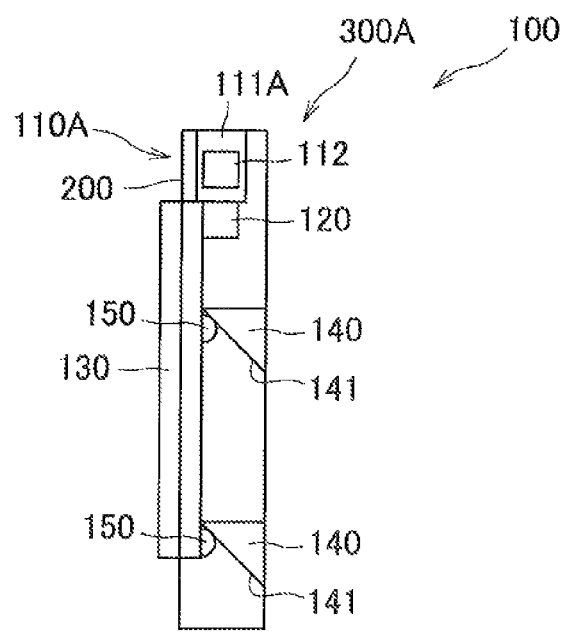
FIG. 4 is an example of a side view of the key input device according to the first embodiment of the present disclosure.
Figure 5:
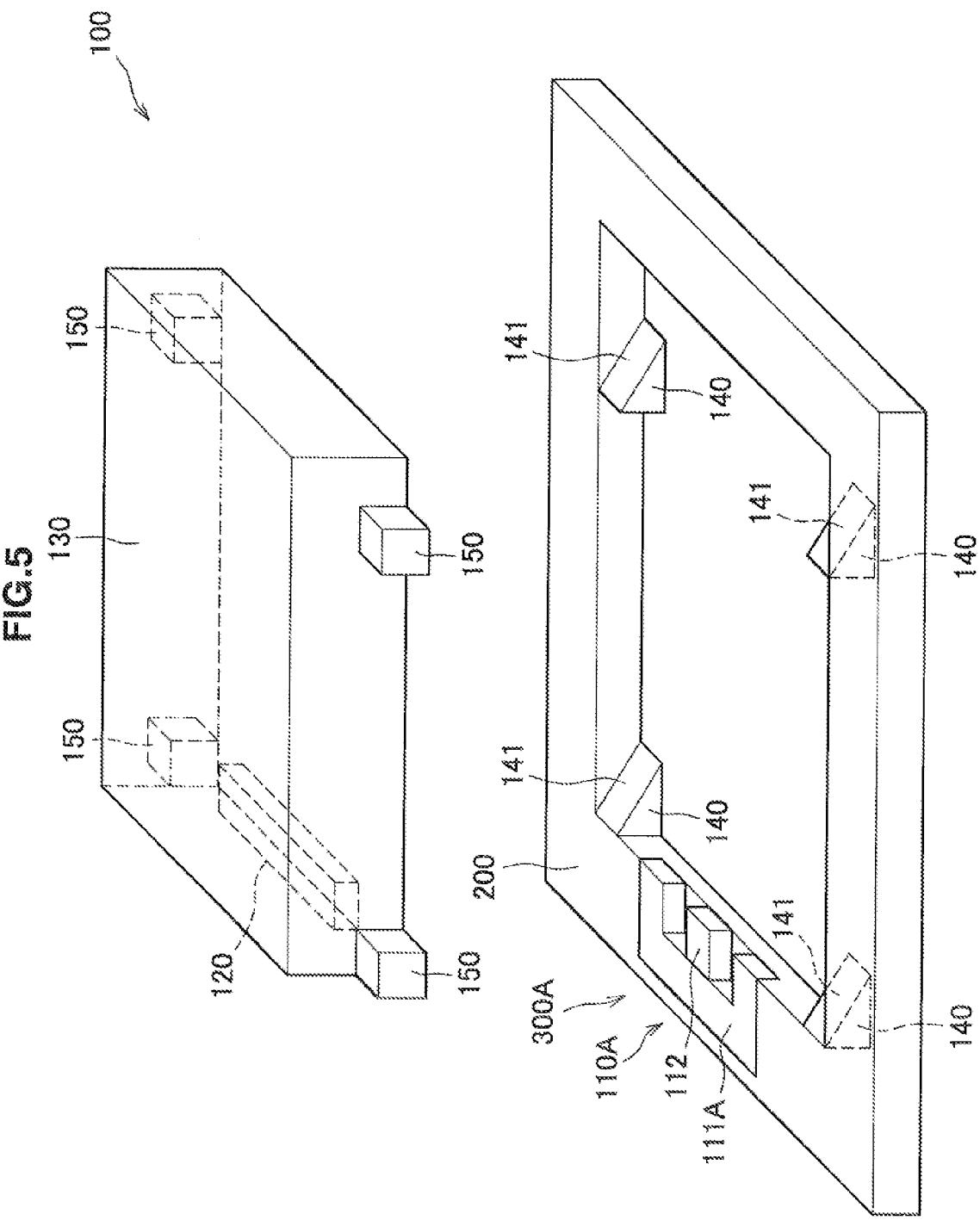
FIG. 5 is an example of an exploded perspective view of the key input device according to the first embodiment of the present disclosure.

An exemplary configuration of the key input unit 100 according to the first embodiment of the present disclosure will now be described. FIG. 3 is an example of a plan view illustrating the key input unit 100 according to the first embodiment of the present disclosure. FIG. 4 is an example of a side view illustrating the key input unit 100 according to the first embodiment of the present disclosure. FIG. 5 is an example of an exploded perspective view illustrating the key input device 100 according to the first embodiment of the present disclosure.

As illustrated in FIG. 3, the key input unit 100 includes a magnetic circuit 300A, a keytop 130, and a support member 200. The keytop 130 is merely one example of a movable body. Thus, in a case where the magnetic circuit 300A is incorporated into a device other than the key input device 12, any other movable body (for example, buttons) may be used as a movable body instead of the keytop 130. In addition, as illustrated in FIG. 3, the magnetic circuit 300A includes a first magnetic body 110A and a second magnetic body 120. The first magnetic body 110A includes a magnet 112 and a yoke plate 111A. The type of the magnet 112 is not particularly limited. As an example, the magnet 112 may be a permanent magnet or an electromagnet.

As illustrated in FIG. 3, the magnet circuit 300A can use a magnetic attraction force acting between the magnet 112 and the second magnetic body 120 as a force for maintaining the keytop 130 in position. Furthermore, the embodiment of the present disclosure allows the magnetic circuit 300A that uses the attractive force between the magnet 112 and the second magnetic body 120 to manufacture at a much lower cost.

More specifically, as illustrated in FIG. 3, the yoke plate 111A forms an opening space 160A at a position that faces the second magnetic body 120. The magnet 112 is disposed in the opening space 160A. In the example illustrated in FIG. 3, the opening space 160A is rectangular in shape, but the shape of the opening space 160A is not limited as described later. Furthermore, in the example illustrated in FIG. 3, a single opening space 160A is shown, but a plurality of the opening spaces 160A may be formed.

With such a configuration, the first magnetic body 110A and the second magnetic body 120 form a closed magnetic path. In particular, in the example illustrated in FIG. 3, the magnet 112 is disposed in the opening space 160A, and thus two closed magnetic paths are formed by the first magnetic body 110A and the second magnetic body 120. Note that, the closed magnetic path corresponds to a path of the magnetic field (lines of magnetic force) that emanates from one magnetic pole end of the magnet 112 and returns to the other magnetic pole end of the magnet 112 through the yoke plate 111A and the second magnetic body 120.

In this way, there is provided a confined magnetic circuit (closed magnetic path) in which a space formed by a magnetic material with a higher magnetic permeability than air (smaller magnetic resistance than air) is used as a path of a magnetic field (lines of magnetic force). Thus, a magnetic field (lines of magnetic force) emanating from the magnet 112 can be concentrated on a particular site, thereby reducing leakage of magnetic flux.

Moreover, the reduction in leakage of magnetic flux can also lead to other effects. For example, it is possible to reduce the influence of magnetic field on the surroundings. As an example of the influence of magnetic field, when a magnetic recording medium is placed near the magnet 112, data stored in the magnetic recording medium may be corrupted due to the magnetic field emanating from the magnet 112. Such influence can be reduced by minimizing leakage of magnetic flux.

Furthermore, it becomes possible to enhance the attractive force acting between the magnet 112 and the second magnetic body 120 by reducing unwanted leakage of magnetic flux and by forming an appropriate magnetic path. In other words, even when the magnet 112 is reduced in size, the attractive force can be maintained. This makes it possible to reduce the number of necessary magnets 112 and manufacture the magnetic circuit 300A that uses the attractive force between the magnet 112 and the second magnetic body 120 at much lower cost. In addition, when a quantity of necessary magnet 112 is reduced, it becomes possible to reduce the load to be imposed on the environment.

As another example of the influence of magnetic field, when there is a sensor near the magnet 112, an electromagnetic noise may be introduced in a result obtained by the sensor. The sensor may be a geomagnetic sensor, an electrostatic capacitive type sensor, or the like. Such influence can be reduced by minimizing leakage of magnetic flux.

Furthermore, as another example of the influence of magnetic field, dust may easily stick to the periphery of the magnet 112. As an example, when the magnetic circuit 300A is incorporated into the key input device 12, dust may easily stick to a surface of the key input device 12. Such influence can be reduced by minimizing leakage of magnetic flux.

As will be described later, the magnet 112 may not be disposed in the opening space 160A. As an example, the magnet 120 may be disposed at a position sandwiched between the yoke plates 111A. Thus, the magnet 112 may be disposed in the opening space 160A or may be disposed at a position sandwiched between the yoke plates 111A.

When a user presses the keytop 130 to enter a key, the state where the magnet 112 and the second magnetic body 120 are magnetically attracted to each other is released, and then the keytop 130 is moved downward. With the downward movement of the keytop 130, the electrical connection is made and an input signal is generated. As an example, when the information processing apparatus 10 receives the generated input signal, the information processing apparatus 10 can detect that the user has entered the key.

It is preferable that the keytop 130 moves obliquely downward.

For this reason, as illustrated in FIG. 4, the support member 200 includes a guide surface 141 which is inclined with respect to a horizontal plane perpendicular to the height direction of the keytop 130. The keytop 130 may be provided with a sliding portion 150 which slides along the guide surface 141. The guide surface 141 is provided on a guide portion 140 included in the support member 200. The shape of the guide surface 141 may be a flat or curved plane.

Furthermore, when the user releases the pressing force to the keytop 130, the keytop 130 moves upward and it returns to the state where the magnet 112 and the second magnetic body 120 are magnetically attracted to each other. In FIG. 5, it is shown the case where the sliding portions 150 are provided at the four corners of the keytop 130 and the guide portions 140 are provided at the four corners of the support member 200. However, the position at which the guide portion 140 is provided and the number the guide portions 140 are not particularly limited. The position at which the sliding portion 150 is provided and the number the sliding portions 150 are not particularly limited.

There has been described an exemplary configuration of the key input unit 100 according to an embodiment of the present disclosure.

2-2. Exemplary Movement of Key Input Unit

Figure 6:
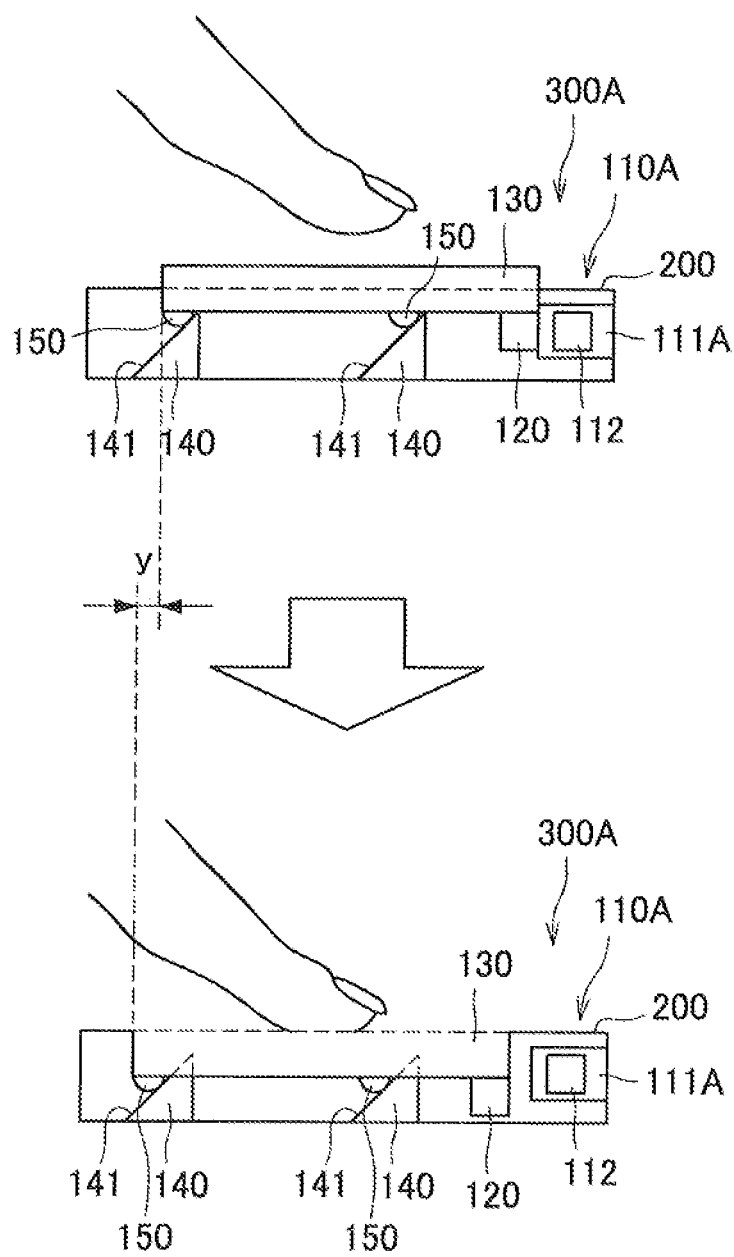
FIG. 6 is a diagram illustrating an example of the movement of the key input device on each keystroke in accordance with the first embodiment of the present disclosure.

An exemplary movement of the key input unit 100 according to the first embodiment of the present disclosure will now be described. FIG. 6 is a diagram illustrating an exemplary movement of the key input unit 100 on each keystroke in accordance with the first embodiment of the present disclosure.

One of the first magnetic body 110A and the second magnetic body 120 may be provided in the keytop 130 and the other thereof may be provided in the support member 200. In other words, one magnetic body of the first magnetic body 110A and the second magnetic body 120 may be provided in the keytop 130, and the other magnetic body of the first magnetic body 110A and the second magnetic body 120 may be provided in the support member 200. In this case, the support member 200 can support the keytop 130 by causing the first magnetic body 110A and the second magnetic body 120 to be magnetically attracted to each other.

In the example illustrated in FIG. 6, the first magnetic body 110A is provided in the support member 200, and the second magnetic body 120 is provided in the keytop 130. In this way, when the first magnetic body 110A is provided in the support member 200, the magnet 112 is fixed to the support member 200, and thus the magnet itself does not move. Accordingly, in this case, the influence of magnetic field change that gives to the surroundings is small compared with the case where the first magnetic body 110A is provided in the keytop 130. As an example, a sensor such as geomagnetic sensors has characteristics that are capable of correcting an externally generated fixed magnetic noise but has a weak resistance to an externally generated varied magnetic noise.

As an example, in a case where the first magnetic body 110A is provided in the keytop 130, when the user presses the keytop 130, the magnet 112 included in the first magnetic body 110A moves downward. In this case, for example, if an electronic device (for example, magnetic recording medium, sensor, or the like) is built into the lower side of the magnet 112, a magnetic field emanated from the magnet 112 is likely to have an influence on the electronic device. As illustrated in FIG. 6, when the first magnetic body 110A is provided in the support member 200, such influence can become less likely to occur.

When the user presses the keytop 130, the guide surface 141 may be inclined so that the sliding portion 150 slides from the back to the front with respect to the user's position. Alternatively, the guide surface 141 may be inclined so that the sliding portion 150 slides from the front to the back with respect to the user's position.

In FIG. 6, there is shown an example where the guide surface 141 is inclined so that the sliding portion 150 slides from the back to the front by the movement amount y with respect to the user's position when the user presses the keytop 130.

When the first magnetic body 110A is provided in the support member 200, it is necessary that the first magnetic body 110A is provided in a position at which the first magnetic body 110A does not interfere with the upward or downward movement of the keytop 130 and the first magnetic body 110A is magnetically attracted to the second magnetic body 120. In other words, as illustrated in FIG. 6, the second magnetic body 120 is formed at the edge of the keytop 130. The first magnetic body 110A may be formed on the outside of the upward or downward range of the keytop 130 at a position that is magnetically attracted to the second magnetic body 120.

Figure 7:
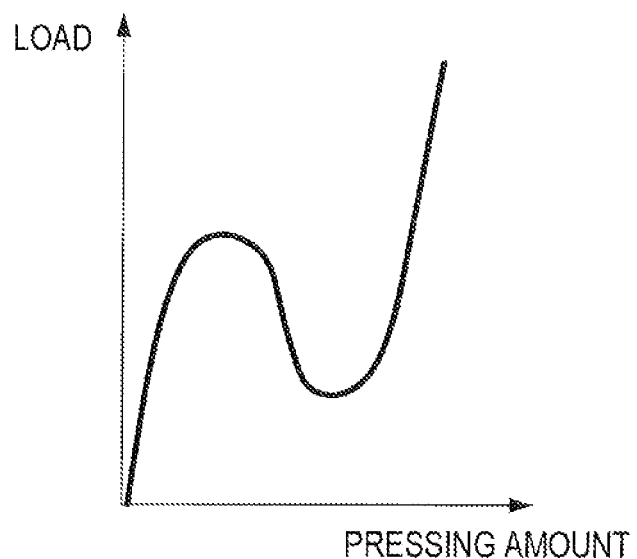
FIG. 7 is a diagram illustrating a relationship between a pressing amount of a keytop and a load applied to the keytop.

FIG. 7 is a graph showing a relationship between a pressing amount of the keytop 130 and a load applied to the keytop 130. As described above, the key input device 12 according to an embodiment of the present disclosure uses attraction between the magnet 112 and the second magnetic body 120. Thus, the relationship between a pressing amount of the keytop 130 and a load applied to the keytop 130 by the user is represented as a curve (an N-shaped curve) as illustrated in FIG. 7.

The relationship between a pressing amount of the keytop 130 and a load applied to the keytop 130, which is represented as a curve, allows the user to feel a click feeling.

There has been described an exemplary movement of the key input unit 100 according to the first embodiment of the present disclosure.

2-3. Exemplary Change in Magnetic Field (Lines of Magnetic Force) Distribution

An exemplary change in a magnetic field (lines of magnetic force) distribution in an example of a magnetic circuit 300A according to the first embodiment of the present disclosure will now be described. FIG. 8 is a diagram illustrating a magnetic field (lines of magnetic force) distribution at the start of pressing the keytop. FIG. 9 is a diagram illustrating a magnetic field (lines of magnetic force) distribution in a state where the keytop is pressed. FIG. 10 is a diagram illustrating a magnetic field (lines of magnetic force) distribution at the end of pressing the keytop.

By referring to FIG. 8, it can be found that the leakage of a magnetic field (lines of magnetic force) emanating from the magnet 112 is extremely small at the start of pressing the keytop. In FIG. 8, the thickness of the support member 200 is indicated as the distance LB, the thickness of the keytop 130 is indicated as the distance LK, and the thickness of the magnet 112 is indicated as the distance LG.

Furthermore, referring to FIG. 9, in a state where the keytop is pressed, the leakage of a magnetic field (lines of magnetic force) from the magnet 112 occurs. In this case, the magnetic field (lines of magnetic force) is concentrated in the vicinity of the gap between the magnet 112 and the second magnetic body 120, and thus it is found that the leakage of a magnetic field (lines of magnetic force) is small. In FIG. 9, the amount of downward movement of the second magnetic body 120 is indicated as the distance LS1.

Referring to FIG. 10, at the end of pressing the keytop, a gap between the magnet 112 and the second magnetic body 120 is made to be large, and a magnetic field (lines of magnetic force) leaking from the magnet 112 extends to the support member 200. However, it can be found that the leakage of magnetic field (lines of magnetic force) is kept small. In particular, the magnetic field (lines of magnetic force) to the lower side of the magnet 112 is suppressed, and thus when an electronic device is built into the lower side of the magnet 112, it is possible to reduce the possibility that leakage of magnetic flux from the magnet 112 has an influence on the electronic device.

In FIG. 10, the amount of downward movement of the second magnetic body 120 is indicated as the distance LS2.

There has been described above an exemplary change in a magnetic field (lines of magnetic force) distribution in an example of a magnetic circuit 300A according to the first embodiment of the present disclosure. An exemplary change in a magnetic field (lines of magnetic force) distribution in an example of a pair of magnets according to a comparative example will be described later with reference to FIGS. 16 to 18.

Figure 11A:
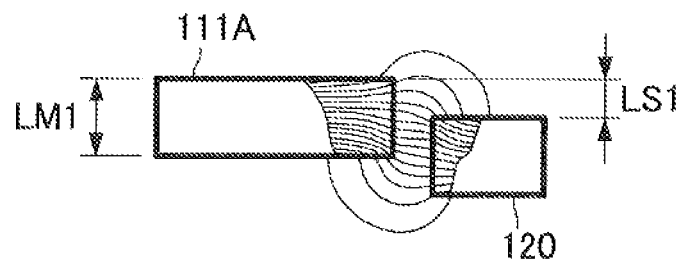
FIG. 11A is a diagram illustrating a magnetic field (lines of magnetic force) distribution in the vicinity of a yoke and a magnetic body in an example of the magnetic circuit according to the first embodiment of the present disclosure.
Figure 11B:
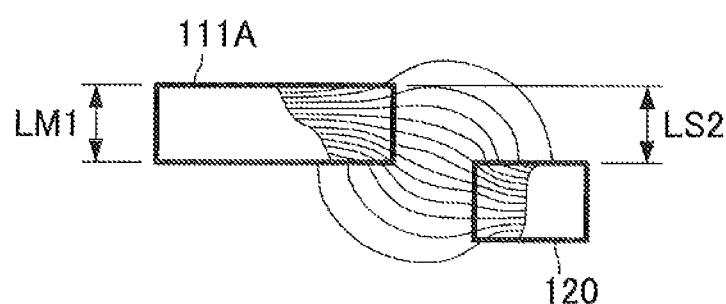
FIG. 11B is a diagram illustrating a magnetic field (lines of magnetic force) distribution in the vicinity of a yoke and a magnetic body in the state where the distance between the magnetic bodies is large compared with the state shown in FIG. 11A.

2-4. Relationship Between Magnetic Body Thickness and Magnetic Field (Lines of Magnetic Force) Distribution Subsequently, a relationship between the thickness and the magnetic field (lines of magnetic force) distribution of a magnetic body provided in the support member 200 will now be described. FIG. 11A is a diagram illustrating a magnetic field (lines of magnetic force) distribution in the vicinity of a yoke and a magnetic body in an example of the magnetic circuit 300A according to the first embodiment of the present disclosure. FIG. 11B is a diagram illustrating a magnetic field (lines of magnetic force) distribution in the vicinity of a yoke and a magnetic body in the state where a distance between the magnetic bodies is large compared with the state shown in FIG. 11A. The magnetic attraction force between the opposite magnetic pole faces generally has the relationship which is proportional to the square of the flux density of a magnetic pole face which is subject to an attraction force and which is proportional to the area of the magnetic pole face.

In the state shown in FIGS. 11A and 11B, the thickness of each of the yoke plate 111A and the second magnetic body 120 is indicated as LM1. In the state shown in FIG. 11A, there are "seven" lines of magnetic force passing through between the opposite magnetic pole faces of the magnetic bodies. On the other hand, in the state shown in FIG. 11B, the distance between the magnetic bodies is large, and there are "four" lines of magnetic force between the magnetic bodies.

Figure 11C:
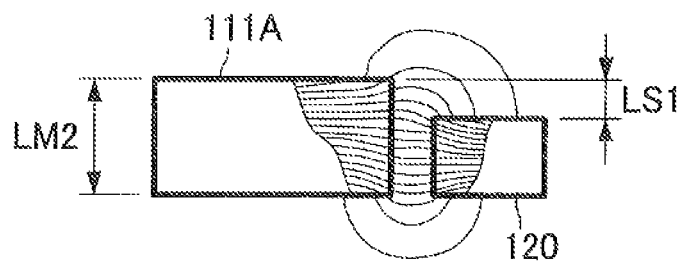
FIG. 11C is a diagram illustrating a magnetic field (lines of magnetic force) distribution in the vicinity of a yoke and a magnetic body in the state where the thickness of a magnetic body provided in a support member is increased compared with the state shown in FIG. 11A.
Figure 11D:
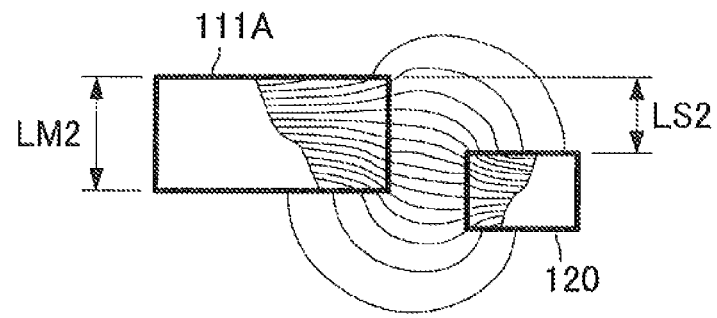
FIG. 11D is a diagram illustrating a magnetic field (lines of magnetic force) distribution in the vicinity of a yoke and a magnetic body in the state where the distance between magnetic bodies is large compared with the state shown in FIG. 11C.

FIG. 11C is a diagram illustrating a magnetic field (lines of magnetic force) distribution in the vicinity of a yoke and magnetic body in the state where the thickness of the magnetic body provided in the support member 200 is increased compared with the state shown in FIG. 11A. FIG. 11D is a diagram illustrating a magnetic field (lines of magnetic force) distribution in the vicinity of a yoke and a magnetic body in the state where the distance between the magnetic bodies is large compared with the state shown in FIG. 11C.

In the state shown in FIGS. 11C and 11D, the thickness of the second magnetic body 120 is indicated as LM1, and the thickness of the yoke plate 111A is indicated as LM2. In the state shown in FIG. 11C, there are "ten" lines of magnetic force between the magnetic bodies. On the other hand, in the state shown in FIG. 11D, the distance between the magnetic bodies is large, and there are "six" lines of magnetic force between the magnetic bodies.

Figure 11E:
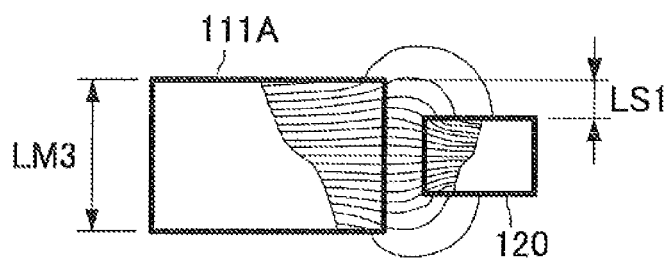
FIG. 11E is a diagram illustrating a magnetic field (lines of magnetic force) distribution in the vicinity of a yoke and a magnetic body in the state where the thickness of a magnetic body provided in a support member is increased compared with the state shown in FIG. 11C.
Figure 11F:
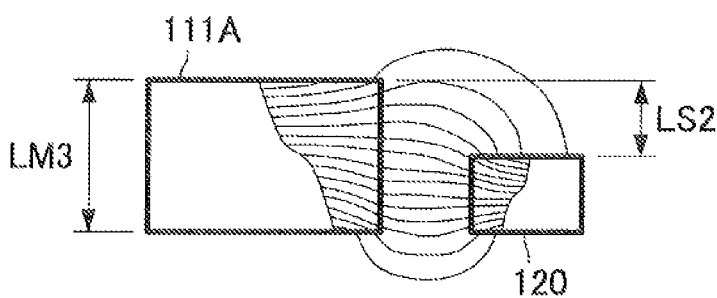
FIG. 11F is a diagram illustrating a magnetic field (lines of magnetic force) distribution in the vicinity of a yoke and a magnetic body in the state where the distance between magnetic bodies is large compared with the state shown in FIG. 11E.

FIG. 11E is a diagram illustrating a magnetic field (lines of magnetic force) distribution in the vicinity of a yoke and a magnetic body in the state where the thickness of the magnetic body provided in the support member 200 is increased compared with the state shown in FIG. 11C. FIG. 11F is a diagram illustrating a magnetic field (lines of magnetic force) distribution in the vicinity of a yoke and a magnetic body in the state where the distance between the magnetic bodies is large compared with the state shown in FIG. 11E.

In the state shown in FIGS. 11E and 11F, the thickness of the second magnetic body 120 is indicated as LM1, and the thickness of the yoke plate 111A is indicated as LM3. In the state shown in FIG. 11E, there are "eleven" lines of magnetic force between the magnetic bodies. On the other hand, in the state shown in FIG. 11F, the distance between the magnetic bodies is large, and there are "eight" lines of magnetic force between the magnetic bodies.

As shown in FIGS. 11A to 11F, when the user presses the keytop 130, the magnetic body provided in the keytop 130 is moved downward together with the keytop 130. Thus, in view of the downward or upward movement of the magnetic body provided in the keytop 130, it is preferable that the thickness of the magnetic body provided in the support member 200 is greater than that of the magnetic body provided in the keytop 130. In this way, even when the magnetic body provided in the keytop 130 is moved downward, it is possible to maintain a stronger attraction force.

As shown in FIGS. 11A to 11F, as the thickness of the magnetic body provided in the support member 200 is larger, the attraction force can be more stably maintained. In particular, when the distance between the magnetic bodies is large, a significant improvement in the rate of increase in the lines of magnetic force passing through between the opposite magnetic pole faces is achieved by increasing the thickness of the magnetic body provided in the support member 200, thereby more stably maintaining the attraction force.

There has been described above the relationship between the thickness and the magnetic field (lines of magnetic force) distribution of a magnetic body provided in the support member 200.

2-5. Modified Example

Figure 12:
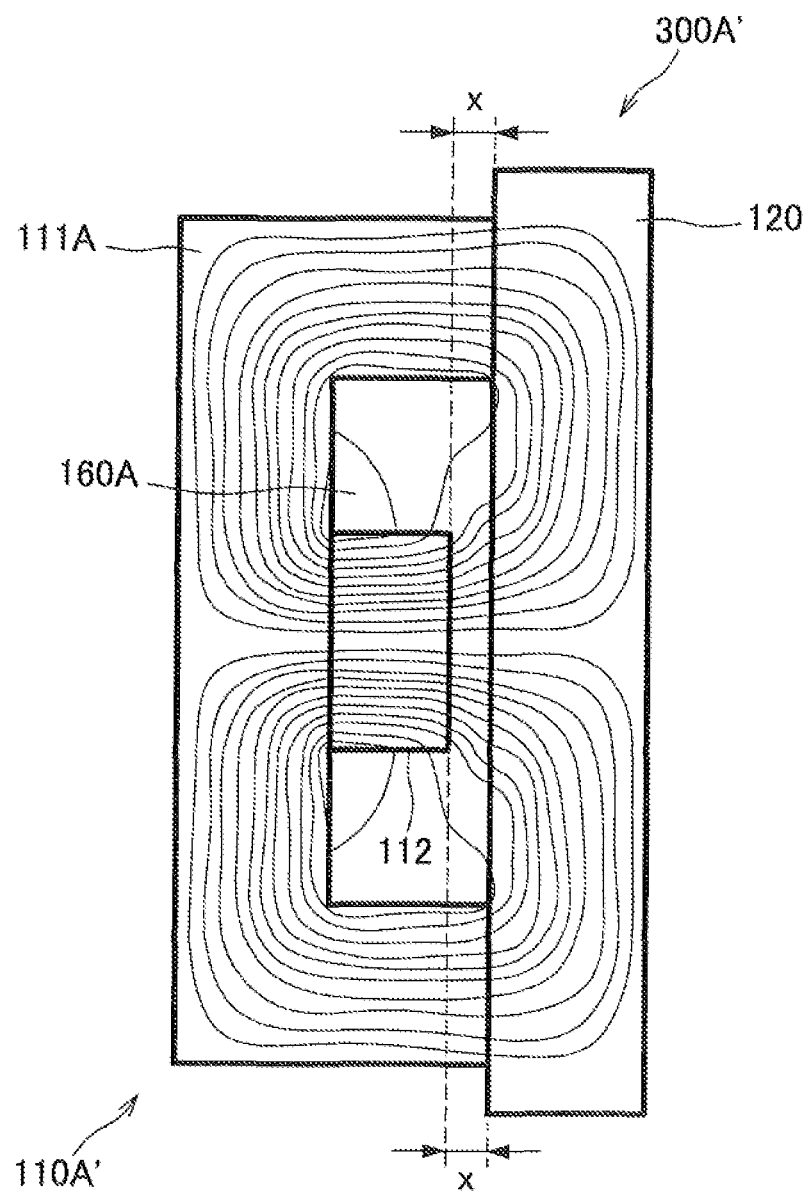
FIG. 12 is a diagram illustrating a magnetic field (lines of magnetic force) distribution in the vicinity of a yoke and a magnetic body in an example of a magnetic circuit according to a modified example of the first embodiment of the present disclosure.

The magnetic field (lines of magnetic force) distribution in an example of the magnetic circuit 300A' according to a modified example of the first embodiment of the present disclosure will now be described. The configuration of the magnetic circuit 300A' according to the modified example of the first embodiment of the present disclosure is different from that of the magnetic circuit according to the first embodiment of the present disclosure. Thus, the following description focuses mainly on the magnetic circuit 300A' according to the modified example of the first embodiment of the present disclosure. FIG. 12 is a diagram illustrating a magnetic field (lines of magnetic force) distribution in the vicinity of a yoke and a magnetic body in the example of the magnetic circuit 300A' according to the modified example of the first embodiment of the present disclosure.

As illustrated in FIG. 12, the magnetic circuit 300A' includes a first magnetic body 110A' and the second magnetic body 120. However, when compared with the first magnetic body 110A according to the first embodiment of the present disclosure, in the first magnetic body 110A' according to the modified example of the present disclosure, the yoke plate 111A has an end portion that protrudes toward the second magnetic 120 to be longer than the magnet 112. FIG. 12 illustrates an example where the end portion of the yoke plate 111A which faces the second magnetic body 120 protrudes from the magnet 112 to the second magnetic 120 by the amount of protrusion x.

With such a configuration, it is possible to prevent damage of the magnet 112 due to the direct collision between the magnet 112 and the second magnetic body 120, thereby improving the durability of the magnetic circuit 300A'. In particular, if a neodymium (Nd—Fe—B) magnet that is a powerful permanent magnet is used as the magnet 112, a plating process for preventing iron contained as a main component of the neodymium magnet from oxidizing is performed. Thus, it is also possible to prevent a surface treatment layer that is subject to the plating process from being peeled.

There has been described above a magnetic field (lines of magnetic force) distribution in an example of the magnetic circuit 300A' according to the modified example of the first embodiment of the present disclosure.

There has been described above the first embodiment of the present disclosure.

3. SECOND EMBODIMENT

Subsequently, the second embodiment of the present disclosure will now be described. The configuration of a magnetic circuit according to the second embodiment of the present disclosure is different from that of the magnet circuit according to the first embodiment of the present disclosure.

Figure 13:
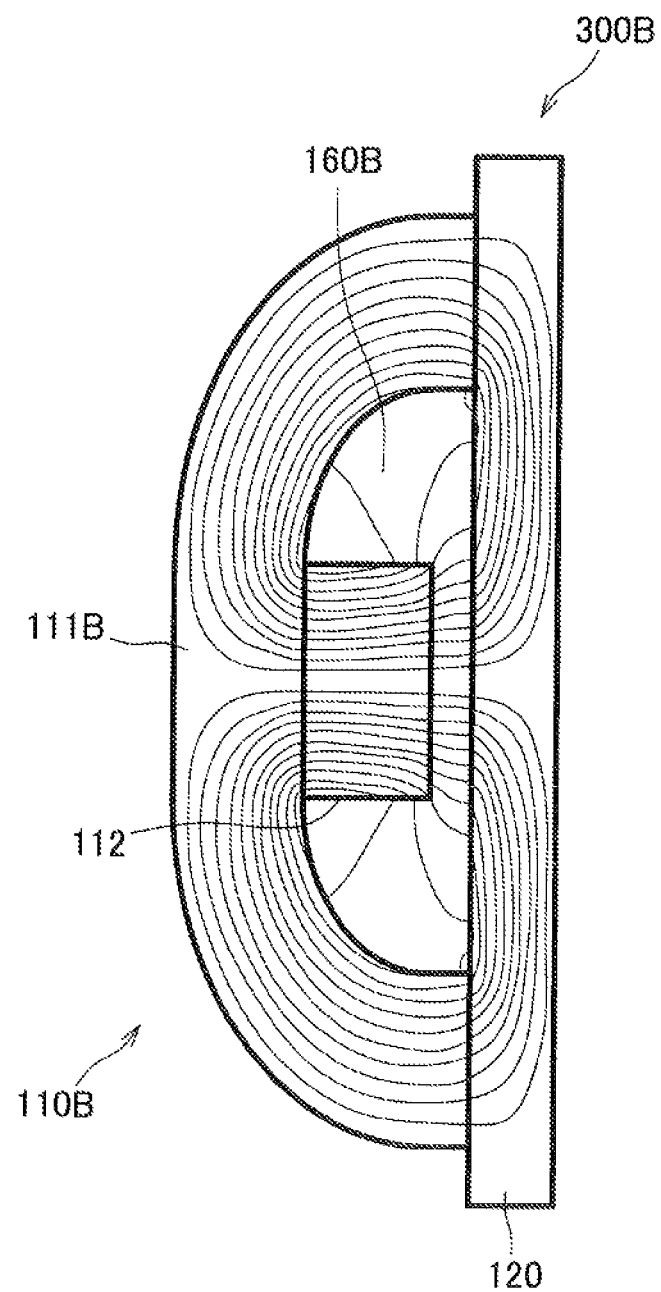
FIG. 13 a diagram illustrating a magnetic field (lines of magnetic force) distribution in the vicinity of a yoke and a magnetic body in an example of a magnetic circuit according to a second embodiment of the present disclosure.

Thus, the following description focuses mainly on a magnetic circuit 300B according to the second embodiment of the present disclosure. FIG. 13 a diagram illustrating a magnetic field (lines of magnetic force) distribution in the vicinity of a yoke and a magnetic body in an example of the magnetic circuit 300B according to the second embodiment of the present disclosure.

As illustrated in FIG. 13, the magnetic circuit 300B includes a first magnetic body 110B and the second magnetic body 120. In the first magnetic body 110A according to the first embodiment of the present disclosure, the yoke plate 111A has a U-shaped cross section with all corners in straight angles. On the other hand, in the first magnetic body 110B according to the second embodiment of the present disclosure, a yoke plate 111B has a U-shaped cross section with round corners. In other words, the shape of the yoke plate 111B is not particularly limited. As shown in FIG. 13, an opening space 160B is formed by the yoke plate 111B, and the magnet 112 is disposed in the opening space 160B.

There has been described above the second embodiment of the present disclosure.

4. THIRD EMBODIMENT

Figure 14:
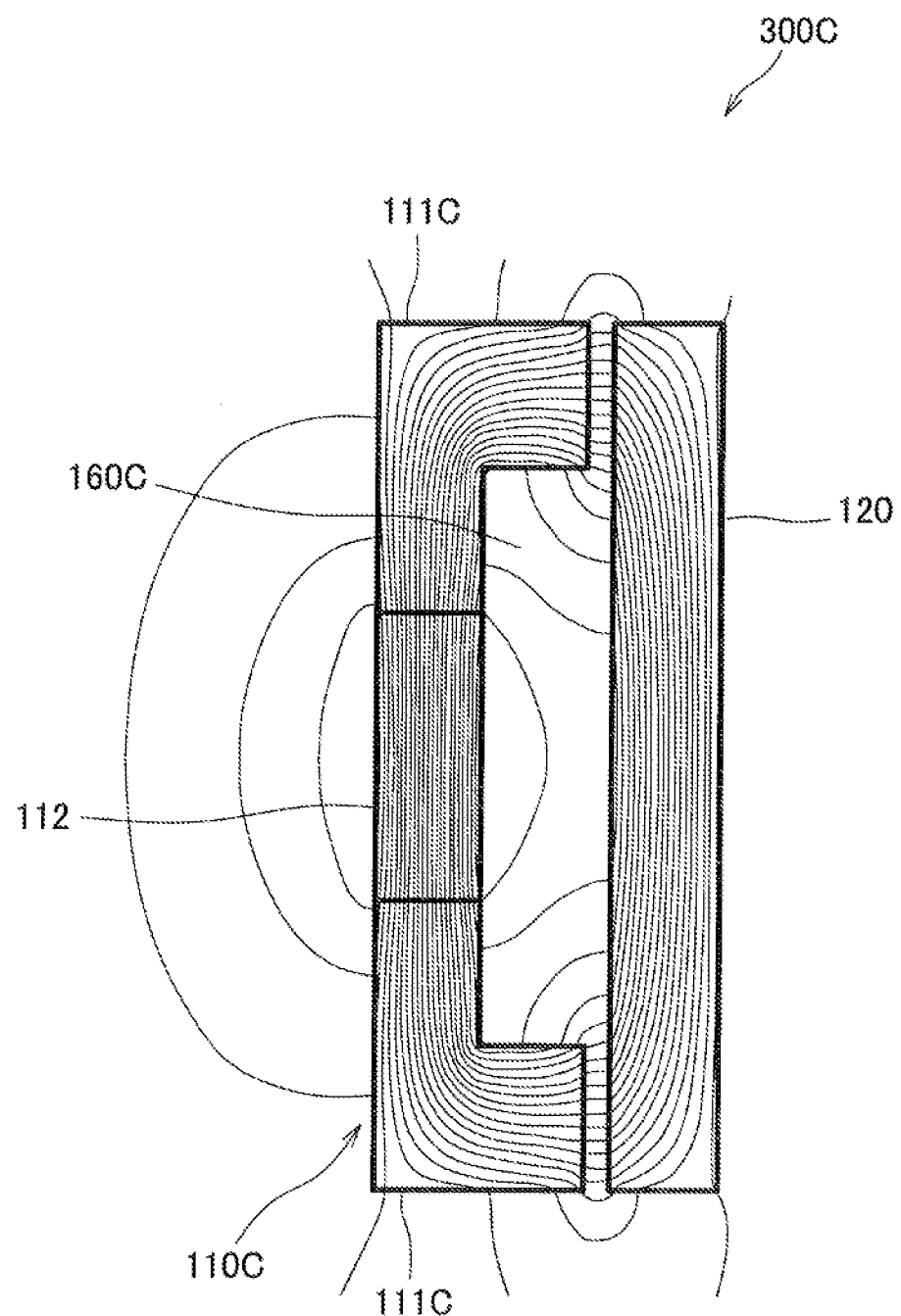
FIG. 14 is a diagram illustrating a magnetic field (lines of magnetic force) distribution in the vicinity of a yoke and a magnetic body in an example of a magnetic circuit according to a third embodiment of the present disclosure.

A third embodiment of the present disclosure will now be described. The configuration of a magnetic circuit according to the third embodiment of the present disclosure is different from that of the magnetic circuit according to the first embodiment of the present disclosure. Thus, the following description focuses on a magnetic circuit 300C according to the third embodiment of the present disclosure. FIG. 14 is a diagram illustrating a magnetic field (lines of magnetic force) distribution in the vicinity of a yoke and a magnetic body in an example of the magnetic circuit 300C according to the third embodiment of the present disclosure.

As illustrated in FIG. 14, the magnetic circuit 300C includes a first magnetic body 110C and the second magnetic body 120. The magnet 112 according to the first embodiment of the present disclosure is disposed in the opening space 160A. On the other hand, the magnet 112 according to the third embodiment of the present disclosure is disposed at a position sandwiched between yoke plates 111C. In an example shown in FIG. 14, the yoke plate 111C forms an opening space 160C.

As illustrated in the example, the magnet 112 is disposed at a position sandwiched between the yoke plates 111C. As shown in FIG. 14A, a single closed magnetic path may be formed by the first magnetic body 110C and the second magnetic body 120. In other words, one or a plurality of closed magnetic paths may be formed.

There has been described above the third embodiment of the present disclosure.

5. FOURTH EMBODIMENT

Figure 15:
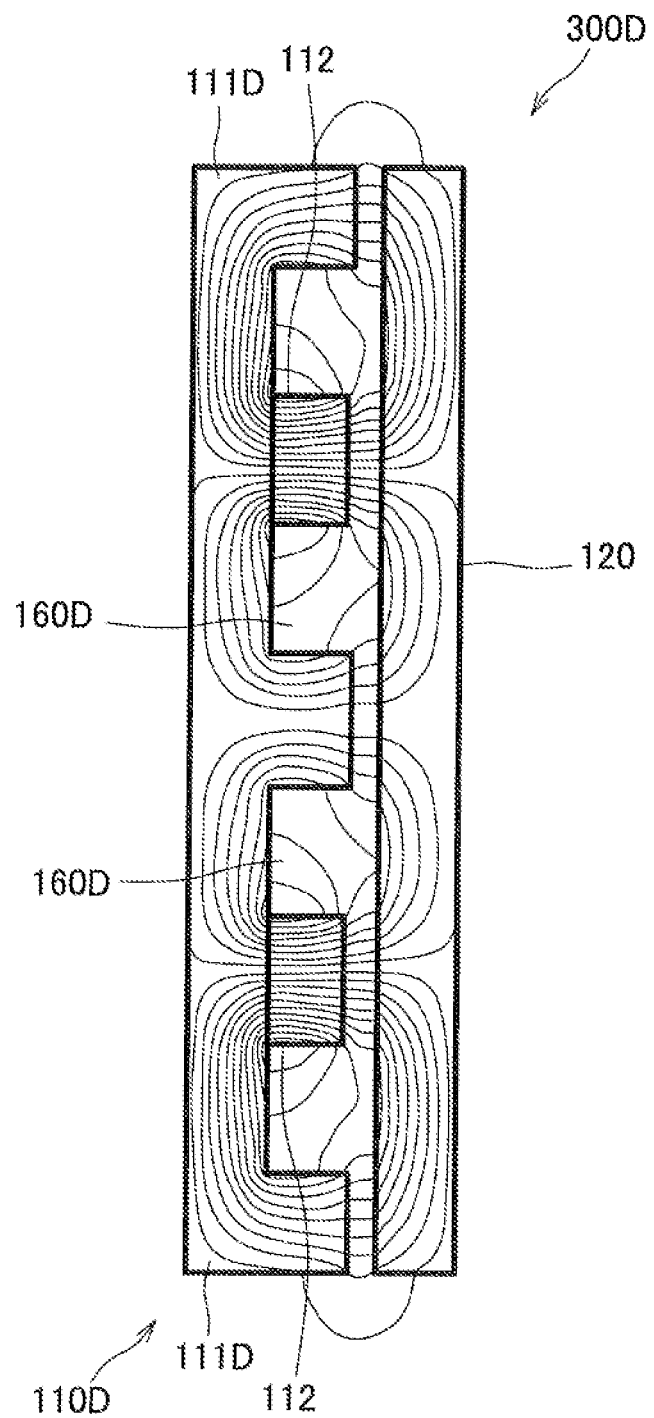
FIG. 15 is a diagram illustrating a magnetic field (lines of magnetic force) distribution in the vicinity of a yoke and a magnetic body in an example of a magnetic circuit according to a fourth embodiment of the present disclosure.

A fourth embodiment of the present disclosure will now be described. The configuration of a magnetic circuit according to the fourth embodiment of the present disclosure is different from that of the magnetic circuit according to the first embodiment of the present disclosure. Thus, the following description focuses on a magnetic circuit 300D according to the fourth embodiment of the present disclosure. FIG. 15 is a diagram illustrating a magnetic field (lines of magnetic force) distribution in the vicinity of a yoke and a magnetic body in an example of the magnetic circuit 300D according to the fourth embodiment of the present disclosure.

As illustrated in FIG. 15, the magnetic circuit 300D includes a first magnetic body 110D and the second magnetic body 120. The yoke plate 111A according to the first embodiment of the present disclosure forms a single opening space 160A. On the other hand, a yoke plate 111D according to the fourth embodiment of the present disclosure forms a plurality of opening spaces 160D. In the example shown in FIG. 15, two opening spaces 160D are formed by the yoke plate 111D.

In other words, the first magnetic body 110D may include a plurality of magnets 112 and a plurality of yoke plates 111D. The yoke plate 111D may form the opening space 160D that faces the second magnetic body 120 and corresponds to each of the plurality of magnets 112. Each of the plurality of magnets 112 is disposed in the corresponding opening space 160D, and thus a plurality of closed magnetic paths may be formed by the first magnetic body 110D and the second magnetic body 120.

There has been described above the fourth embodiment of the present disclosure.

6. CONCLUSION

As described above, according to the embodiments of the present disclosure, there can be provided the magnetic circuit that includes the first magnetic body 110A and the second magnetic body 120. The first magnetic body 110A includes the magnet 112 and the yoke plate 111A. The yoke plate 111A forms the opening space 160A at a position facing the second magnetic 120, and the magnet 112 is disposed in the opening space 160A or at a position sandwiched between the yoke plates 111A.

With such a configuration, it is possible to manufacture the magnetic circuit 300A that uses an attractive force between the magnet 112 and the second magnetic body 120 at much lower cost.

In order to understand more clearly the effects to be expected from the magnetic circuit according to the embodiments, an exemplary change in the magnetic field (lines of magnetic force) in an example of a pair of magnets according to a comparative example will now be described. FIG. 16 is a diagram illustrating a magnetic field (lines of magnetic force) distribution at the start of pressing a keytop according to a comparative example. FIG. 17 is a diagram illustrating a magnetic field (lines of magnetic force) distribution in a state where the keytop is pressed according to a comparative example. FIG. 18 is a diagram illustrating a magnetic field (lines of magnetic force) distribution at the end of pressing a keytop according to a comparative example.

As illustrated in FIGS. 16 to 18, in these comparative examples, the attraction force between the pair of magnets (magnets 912 and 912B) can be used as a force for maintaining the keytop 130 in position. With reference to FIGS. 16 to 18, in these comparative examples, it can be found that the distribution of lines of magnetic force is formed in a figure-of-eight shape around the pair of magnets (magnets 912 and 912B) or the magnet 912A (magnet 912B) constituting the pair of magnets and is spread to the horizontal and vertical directions of the surrounding space.

Note that the preferred embodiments of the present disclosure have been described in detail with reference to the appended drawings. However, the embodiments of the present disclosure are not limited to the examples described above. It should be understood by those skilled in the art that various modifications, combinations, sub-combinations and alterations may occur depending on design requirements and other factors insofar as they are within the scope of the appended claims or the equivalents thereof.

Additionally, the present technology may also be configured as below.

(1) A magnetic circuit including:
a first magnetic body configured to include a magnet and a yoke plate; and
a second magnetic body,
wherein the yoke plate forms an opening space at a position facing the second magnetic body, and
wherein the magnet is disposed in the opening space or at a position sandwiched between the yoke plates.

(2) The magnetic circuit according to (1),
wherein one of the first magnetic body and the second magnetic body is provided in a movable body,
wherein the other of the first magnetic body and the second magnetic body is provided in a support member, and
wherein the support member supports the movable body by causing the first magnetic body and the second magnetic body to be magnetically attracted to each other.

(3) The magnetic circuit according to (2),
wherein the first magnetic body is provided in the support member, and
wherein the second magnetic body is provided in the movable body.

(4) The magnetic circuit according to (2) or (3),
wherein the second magnetic body is formed on an edge of the movable body, and
wherein the first magnetic body is formed on an outside of an upward and downward movement range of the movable body at a position that is magnetically attracted to the second magnetic body.

(5) The magnetic circuit according to any one of (2) to (4),
wherein the support member has a guide surface that is inclined with respect to a horizontal plane perpendicular to a height direction of the movable body, and
wherein the movable body includes a sliding portion that slides on the guide surface.

(6) The magnetic circuit according to any one of (2) to (5),
wherein the magnetic body provided in the support member has a thickness greater than a thickness of the magnetic body provided in the movable body.

(7) The magnetic circuit according to any one of (1) to (6),
wherein the yoke plate has an end portion that faces the second magnetic body, the end portion protruding toward the second magnetic body to be longer than the magnet.

(8) The magnetic circuit according to any one of (1) to (7),
wherein the first magnetic body and the second magnetic body form a closed magnetic path.

(9) The magnetic circuit according to (8), wherein when the magnet is disposed in the opening space, the first magnetic body and the second magnetic body form two closed magnetic paths.

(10) The magnetic circuit according to (8), wherein when the magnet is disposed at a position sandwiched between the yoke plates, the first magnetic body and the second magnetic body form a single closed magnetic path.

(11) The magnetic circuit according to (8),
wherein the first magnetic body includes a plurality of magnets and a yoke plate,
wherein the yoke plate forms an opening space corresponding to each of the plurality of magnets and facing the second magnetic body, and
wherein when each of the plurality of magnets is disposed in the corresponding opening space, the first magnetic body and the second magnetic body form a plurality of closed magnetic paths.

(12) A key input device according to (4), including:
the magnetic circuit according to (5),
wherein the movable body is a keytop to be pressed by a user.

(13) The key input device according to (12), wherein the guide surface is inclined so that the sliding portion slides from the back to the front with respect to a user's position when the keytop is pressed by the user.

(14) A key input device including:
a magnetic circuit,
wherein the magnetic circuit includes
a first magnetic body configured to include a magnet and a yoke plate; and
a second magnetic body,
wherein the yoke plate forms an opening space at a position facing the second magnetic body, and
wherein the magnet is disposed in the opening space or at a position sandwiched between the yoke plates.

(15) The key input device according to (14),
wherein one of the first magnetic body and the second magnetic body is provided in a movable body,
wherein the other of the first magnetic body and the second magnetic body is provided in a support member, and
wherein the support member supports the movable body by causing the first magnetic body and the second magnetic body to be magnetically attracted to each other.

(16) The key input device according to (15),
wherein the first magnetic body is provided in the support member, and
wherein the second magnetic body is provided in the movable body.

(17) The key input device according to (15),
wherein the second magnetic body is formed on an edge of the movable body,
wherein the first magnetic body is formed on an outside of an upward and downward movement range of the movable body at a position that is magnetically attracted to the second magnetic body.

(18) The key input device according to (15),
wherein the support member has a guide surface that is inclined with respect to a horizontal plane perpendicular to a height direction of the movable body,
wherein the movable body includes a sliding portion that slides on the guide surface.

(19) The key input device according to (15), wherein the magnetic body provided in the support member has a thickness greater than a thickness of the magnetic body provided in the movable body.

(20) The key input device according to (14), wherein the yoke plate has an end portion that faces the second magnetic body, the end portion protruding toward the second magnetic body to be longer than the magnet.

What is claimed is:
1. A magnetic circuit comprising:
a first magnetic body configured to include (i) a magnet and a yoke plate, or (ii) the magnet and two yoke plates; and
a second magnetic body,
wherein the yoke plate forms an opening space at a position facing the second magnetic body,
wherein the magnet is disposed in the opening space or at a position sandwiched between the two yoke plates,
wherein one of the first magnetic body and the second magnetic body is provided in a movable body,
wherein the other of the first magnetic body and the second magnetic body is provided in a support member,
wherein the support member supports the movable body by causing the first magnetic body and the second magnetic body to be magnetically attracted to each other, wherein the support member has a guide surface that is inclined with respect to a horizontal plane perpendicular to a height direction of the movable body, and wherein the movable body includes a sliding portion that slides on the guide surface.

2. A key input device comprising:

the magnetic circuit according to claim 1, wherein the movable body is a keytop to be pressed by a user.

3. The key input device according to claim 2, wherein the guide surface is inclined so that the sliding portion slides from the back to the front with respect to a user's position when the keytop is pressed by the user.

4. A key input device comprising:

a magnetic circuit, wherein the magnetic circuit includes a first magnetic body configured to include a magnet and a yoke plate; and a second magnetic body, the yoke plate forms an opening space at a position facing the second magnetic body, and the magnet is disposed in the opening space, and the first magnetic body and the second magnetic body being arranged within the magnetic circuit such that one of the first magnetic body or the second magnetic body is movable relative to the other one of the first magnetic body or the second magnetic body in an oblique direction.

5. The key input device according to claim 4, wherein one of the first magnetic body and the second magnetic body is provided in a movable body, wherein the other of the first magnetic body and the second magnetic body is provided in a support member, and wherein the support member supports the movable body by causing the first magnetic body and the second magnetic body to be magnetically attracted to each other.

6. The key input device according to claim 5, wherein the first magnetic body is provided in the support member, and wherein the second magnetic body is provided in the movable body.

7. The key input device according to claim 5, wherein the second magnetic body is formed on an edge of the movable body, wherein the first magnetic body is formed on an outside of an upward and downward movement range of the movable body at a position that is magnetically attracted to the second magnetic body.

8. The key input device according to claim 5, wherein the magnetic body provided in the support member has a thickness greater than a thickness of the magnetic body provided in the movable body.

9. The key input device according to claim 4, wherein the yoke plate has an end portion that faces the second magnetic body, the end portion protruding toward the second magnetic body to be longer than the magnet.

10. A key input device comprising:

a magnetic circuit, wherein the magnetic circuit includes a first magnetic body configured to include (i) a magnet and a yoke plate, or (ii) the magnet and two yoke plates; and a second magnetic body, wherein the yoke plate forms an opening space at a position facing the second magnetic body, wherein the magnet is disposed in the opening space or at a position sandwiched between the two yoke plates, wherein one of the first magnetic body and the second magnetic body is provided in a movable body, wherein the other of the first magnetic body and the second magnetic body is provided in a support member, wherein the support member supports the movable body by causing the first magnetic body and the second magnetic body to be magnetically attracted to each other, wherein the support member has a guide surface that is inclined with respect to a horizontal plane perpendicular to a height direction of the movable body, and wherein the movable body includes a sliding portion that slides on the guide surface.

\* \* \* \* \*